G. S. Barton.
Mach. for Printing Paper, Cloth, &c.
N° 95758.   Patented Oct. 12. 1869.

WITNESSES:
Thos. H. Dodge
Geo. H. Miller

INVENTOR:
Geo. S. Barton

United States Patent Office.

GEORGE S. BARTON, OF WORCESTER, MASSACHUSETTS.

Letters Patent No. 95,758, dated October 12, 1869.

IMPROVEMENT IN MACHINES FOR PRINTING PAPER, CLOTH, &c.

The Schedule referred to in these Letters Patent and making part of the same.

*Know all men by these presents:*

That I, GEORGE S. BARTON, of the city and county of Worcester, and Commonwealth of Massachusetts, have invented certain new and useful Improvements in Machines for Printing Paper, Cloth, and other similar materials; and I do hereby declare that the following is a full, clear, and exact description of the same, reference being had to the accompanying drawings, forming a part of this specification, in which—

Figure 1:
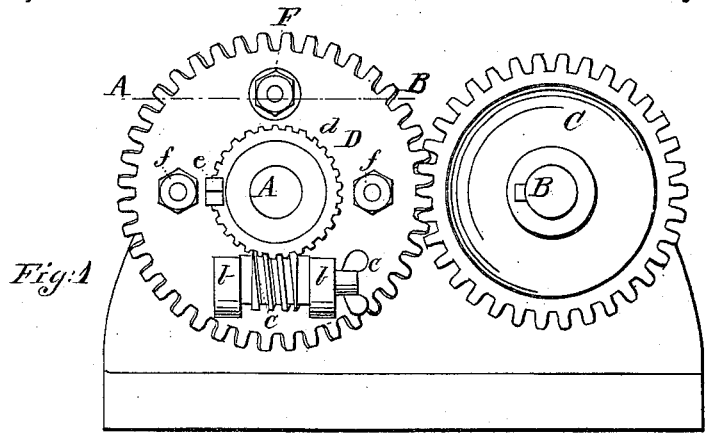
Figure 1 represents an end view of so much of a machine for printing paper, cloth, &c., as is necessary to illustrate my prevent improvements.

To enable those skilled in the art to which my invention belongs to make and use the same, I will proceed to describe it more in detail.

In the drawings—

The part marked A represents one of the shafts, upon which the engraved cylinders are to be placed.

Figure 2:
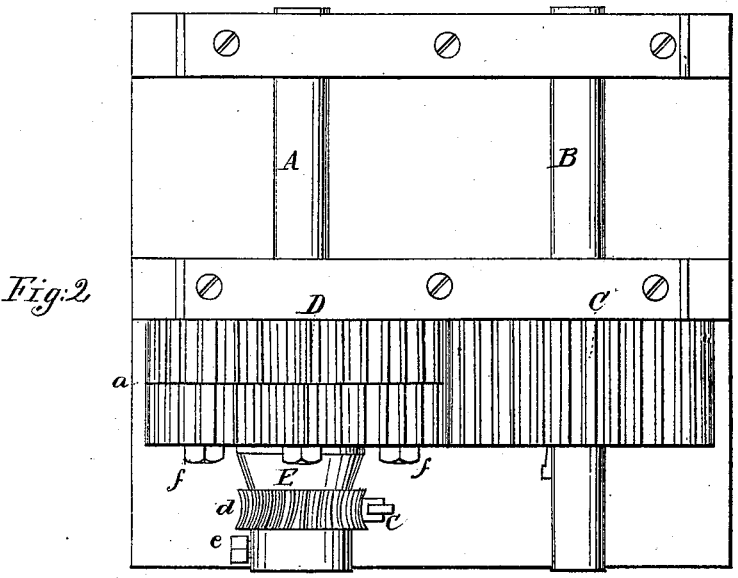
Figure 2 represents a top or plan view of fig. 1.
Figure 3:
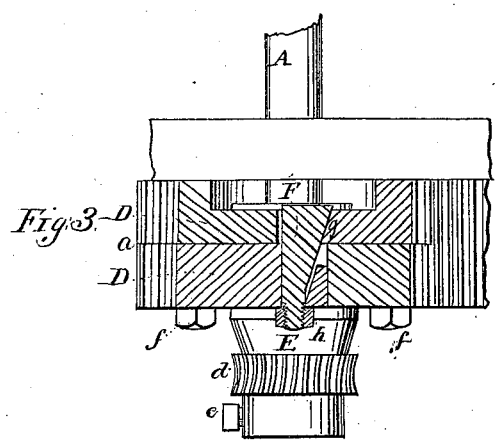
Figure 3 represents a longitudinal section on line A B, fig. 1.

Upon the ends of these shafts are placed gears D, the gears being cut in two in the centre, as indicated by the dark line $a$, figs. 2 and 3.

From the face of the outer half of gear D projects the stands $b\ b$, in which is supported the thumb-screw $c$, which takes into the gear $d$, fast on the quill E, the inner end of quill E being fitted to turn loosely in gear D, and being held to shaft A by means of the set-screw $e$.

The two halves of gear D are held together by means of bolts $f\ f$, the inner half of the gear having slotted holes, through which the bolts $f\ f$ pass.

F is a wedge-bolt, which passes through a slot in the inner half of the gear D, one edge of which is slightly inclined, as seen at $g$, to fit the inclined edge of bolt F, as fully shown in fig. 3 of the accompanying drawings.

The small end of the wedge-bolt F passes through a slot in the outer half of gear D, and is provided with a nut, $h$.

The hole, or slot in the outer half of the gear D is made large enough to allow of the wedge-bolt F being drawn in through the inner half somewhat, for the purpose of taking up any play, or "backlash" in the gears C D.

The operation of taking up the back-ash is as follows:

The nuts on the bolts $f\ f$ are loosened, and nut $h$, on the wedge-bolt F, screwed up, thereby drawing the two halves of gear D in opposite directions, until a close fit is obtained in gear C, when nuts $f\ f$ are screwed up, and the halves of gear D securely fastened in the adjusted position.

In fig. 2, the relative positions of the two halves of gear D are shown when thus adjusted. As the teeth of the gears wear so as to occasion further backlash, the same operation is to be repeated.

It sometimes happens that one cylinder is slightly larger or smaller than another working on the same figure, and, after running sometime, it falls behind or runs forward of its proper position, and thus occasions a slight imperfection in the printing of the paper or cloth. To remedy this derangement, the operator can, even while the machine is in operation, take hold of thumb-screw $c$, and throw shaft A, with its cylinder thereon, forward or back, as respects the cylinder on shaft B, until the cylinders occupy the proper relative positions as respects each other.

The teeth of the thumb-screw $c$ form a secure connection with the gear $d$ on quill E, which is fastened to the shaft A, for driving the latter and its cylinder from the gear C.

It may be remarked in this connection, that a series of shafts, A, with adjustable gears D, and the other devices connected therewith, are to be arranged around the gear C and shaft B, with its cylinder, for the purpose of printing a number of colors upon the material at one and the same operation.

Those skilled in the art to which my invention belongs will understand the proper application of my improvements to machines for printing paper and cloth without any further description. They will also understand and fully appreciate the great practical advantages resulting therefrom.

Having described my improvements in machines for printing paper, cloth, and other similar materials,

What I claim therein as new, and of my invention, and desire to secure by Letters Patent, is—

The combination, with the divided gear D, of the holding-bolts $f\ f$ and the adjusting wedge-bolt F, substantially as and for the purposes set forth.

GEO. S. BARTON.

Witnesses:
THOS. H. DODGE,
GEO. H. MILLER.